United States Patent [19]

Kennedy et al.

[11] Patent Number: 4,946,899

[45] Date of Patent: Aug. 7, 1990

[54] THERMOPLASTIC ELASTOMERS OF ISOBUTYLENE AND PROCESS OF PREPARATION

[75] Inventors: Joseph P. Kennedy; Judit E. Puskas; Gabor Kaszas; William G. Hager, all of Akron, Ohio

[73] Assignee: The University of Akron, Akron, Ohio

[21] Appl. No.: 285,207

[22] Filed: Dec. 16, 1988

[51] Int. Cl.$^5$ .................................. C08F 255/10
[52] U.S. Cl. .............................. 525/244; 525/245; 525/251; 525/255; 525/258; 525/259; 525/261; 525/262; 525/268; 525/270; 525/319
[58] Field of Search ............. 525/244, 255, 259, 261, 525/267, 270, 319, 245, 251, 258, 262, 268

[56] References Cited

U.S. PATENT DOCUMENTS 4,057,600 11/1977 Kimura et al. ............. 525/267
4,276,394 6/1981 Kennedy ..................... 525/244

*Primary Examiner*—Wilbert J. Briggs, Sr.
*Attorney, Agent, or Firm*—Oldham & Oldham Co.

[57] ABSTRACT

Block copolymers compose a polyisobutylene rubbery soft segment of $\overline{M}_n$ of about 5,000 to above 500,000 and glassy hard segments of $\overline{M}_n$ of about 5,000 or higher and usually about 10,000 to 35,000 or more, are made by preparing a living polymer block of the polyisobutylene and then polymerizing on said living polyisobutylene block the glassy hard segments by adding thereto an electron donor having a donor number of 15 to 50 and then adding and polymerizing the monomers for the glassy hard segments. The monomers for the glassy hard segments are styrene and its derivatives and indene and its derivatives and mixtures thereof.

12 Claims, No Drawings

THERMOPLASTIC ELASTOMERS OF ISOBUTYLENE AND PROCESS OF PREPARATION

Technical Field

This invention relates to block copolymers. More particularly, this invention relates to thermoplastic elastomeric polymers (TPE) having a central portion which exhibits rubbery properties and end portions which possess a glassy character. Specifically, this invention relates to block copolymers, and especially to thermoplastic elastomeric products prepared by carbocationic polymerization involving an initial homopolymerization of a monomer to form a polymer capable of conferring elastomeric properties on an ultimate product without curing. The homopolymerization is followed by the subsequent addition of a monomer or a mixture of monomers capable of forming endblock polymer or copolymer segments which confer glassy properties on the ultimate block copolymer product and the copolymerization of the latter monomer with the homopolymer to form an ultimate product exhibiting both elastomeric and thermoplastic properties.

Background of the Invention

Polymeric materials exhibiting both thermoplastic as well as elastomeric characteristics have a variety of unique properties which makes such materials valuable articles of commerce. Such thermoplastic elastomers are block copolymers having the general structure of ABA (linear triblock), $A(BA)_n$ (linear alternating block), or $(AB)_n-X$ (radial block) where A is a thermoplastic, glassy block with a high glass transition temperature, while B is an elastomeric block, and n is a positive whole number and X is the initiator core or residue. The copolymers behave like vulcanized rubbers at room temperature and like thermoplastic polymers at higher temperatures. Thus, the materials can be melt extruded like plastics, while retaining their beneficial rubbery features upon cooling. This ability is not only of advantage during processing of the polymers, but allows the materials to be reprocessed. Furthermore, not only are such products fundamentally elastomeric but they exhibit physical behavior similar to elastomers which have been reinforced with reinforcing agents. In other words, the products behave substantially in the same manner as vulcanized rubbers, but without the need to subject them to vulcanization, which is often impractical because of the nature of the product being produced, for example, adhesives, coatings and elastic threads.

Polymers having such dual nature have been known for some time but have the product deficiencies indicated below in this section. One such family of products, for example, being that prepared by copolymerizing polystyrene with polybutadiene, is sold under the trade name "Kraton" by Shell Oil Company. While the latter products possess the desirable fundamental duality of properties described, they also possess certain undesirable characteristics. For example, their glass transition temperatures are undesirably low, in the neighborhood of 90° C., limiting the temperature environment in which they can be used. In addition, the products possess an undesirably high degree of unsaturation in their central polymer block portion which makes them vulnerable to oxidative degradation through exposure to air. While such degradation may be avoided by subjecting the products to techniques which saturate their double bonds, the additional processing is expensive. In a copending application, Ser. No. 208,374, filed on 06/17/88 of the inventors herein, a block copolymer is disclosed containing polyisobutylene elastomeric midsegment and post-cyclized polyisoprene outer hard segments having a glass transition temperature around 150° C. Though this latter copolymer is superior to Kraton in oxidative stability and in regard to the higher glass transition temperature of the outer blocks, the post cyclized outer segments still contain unsaturation. Furthermore, the post-cyclization of the uncyclized prepolymer entails undesirable expense and the post-cyclized products reach desirable physical strength only after an extended period of time.

Attempts have previously been made to synthesize fully saturated polystyrene-polyisobutylene-polystyrene (Zs. Fodor, J. P. Kennedy, T. Kelen and F. Tudos: J. Macromol.Sci.-Chem. (A24(7), 735 (1987)) and poly($\alpha$) methylstyrene-polyisobutylene-poly($\alpha$)methylstyrene (J. P. Kennedy, R. A. Smith; J.Polymer Sci., Polym.Chem.Ed., 18, 1539 (1980)) linear triblock copolymers. The final products, however, were not pure but inhomogeneous, and exhibited very poor physical properties, even after laborious separation procedures, due to the nonuniform distribution of polystyrene in the final product. These products cast as a film were so weak as to exhibit no tensile, much less than 100 psi.

SUMMARY OF THE INVENTION

A first aspect of the invention, therefore, is to provide a process by sequential monomer addition techniques for preparing block copolymers which exhibit both thermoplastic and elastomeric properties.

The second aspect of the invention is to prepare the elastomeric section of thermoplastic elastomeric copolymers by living polymerizations employing multifunctional polymerization initiator systems.

A further aspect of this invention is to prepare new thermoplastic elastomeric copolymers whose elastomeric section is saturated, and thus is less susceptible to oxidation.

Yet another aspect of the invention is to prepare thermoplastic elastomers whose outer glassy blocks exhibit relatively high glass transition temperatures.

Another aspect of the invention is to prepare thermoplastic elastomers whose outer glassy blocks are copolymers of two or more monomers containing aromatic groups, thus the $T_g$ of the outer blocks may be adjusted by varying the composition of the outer glassy copolymer blocks.

Another aspect of this invention is to provide block copolymers in which the elastomeric portion has a relatively narrow molecular weight distribution.

The foregoing and other aspects of the invention, as it will become apparent in the following disclosure of the invention, are provided by a polymerization process for preparing block copolymers comprising the following steps carried out at a temperature below $-40°$ C. in the first phase, forming a living polyisobutylene block of the desired molecular weight, functionality, and relatively narrow molecular weight distribution (as disclosed in our co-pending patent applications Ser. No. 07/189,774 filed 05/03/88; and Ser. No. 208,374 filed 06/17/88) and in the second phase polymerizing another monomer or mixtures of monomers on said living polyisobutylene block to form end groups having aromatic groups by adding an electron pair donor having a donor number from about 15 to about 50, sometimes hereinafter called an inherent electron donor and the other monomer or mixtures of monomers to the reaction mixture. Addition of the inherent electron pair donor is thought to avoid undesirable side reactions and to assure complete blocking from said living polyisobutylene midsection in the subsequent end block polymerization step. The second or other monomer or mixture of monomers consists of styrene, alkylated styrene, halostyrene, indene and alkylated indene and like derivatives. Polymerizing said second monomer or mixture of monomers according to our process forms a diblock, triblock or a star-shaped block copolymer in which said first polymer comprises the midblock and said second monomer or mixture of monomers having ethylenically unsaturated aromatic groups form the endblock or endblocks of said block copolymer.

The foregoing and additional aspects of the invention are provided by a triblock or a star-shaped block copolymer comprising a polyisobutylene midblock and endblocks of polymerized styrene or styrene derivative viz. ring alkylated styrene or ring halogenated styrene or indene or indene derivative viz. alkylated indene or their copolymers, wherein the ratio of weight average molecular weight to number average molecular weight of said midblock is from about 1.01 to about 1.5 wherein the ratio of average molecular weight to number average molecular weight of said block copolymer is from about 1.05 to about 2.0 and no more than about 3.0 with a tensile of greater than 100 to 500 or 1000 or more.

DETAILED DESCRIPTION OF THE INVENTION

Thermoplastic elastomers containing elastomeric polyisobutylene blocks are extremely useful materials due in part to the saturated nature of their midblock segments. They exhibit a unique combination of properties including a high degree of resistance to penetration by either moisture or gases, together with a high degree of thermal and oxidative stability. The products also exhibit a self-reinforcing characteristic as a result of the fact that the glassy blocks and the elastomeric blocks show phase separation.

In preparing the thermoplastic elastomers of the invention the polymerization reaction is conducted under conditions which would avoid chain transfer and termination of the growing polymer chains. Anhydrous conditions are essential and reactive impurities, such as components containing active hydrogen atoms (water, alcohol and the like) must be removed from both the monomer and solvents by the well-known techniques. The temperature for the polymerization is usually between $-10°$ and $-90°$ C., the preferred range being between $-40°$ and $-80°$ C., although lower temperatures may be employed if desired. In order to avoid moisture condensation the reaction should be carried out under a dry inert gas atmosphere, preferably nitrogen gas.

The midblock portion of the thermoplastic elastomers of the invention is prepared by procedures disclosed in our co-pending patent applications Ser. No. 07/189,774 filed 05/03/88 and 07/208,374 filed 06/17/88. Our two co-pending applications are incorporated herein by reference. The functionality of the initiators used for the preparation of the living polyisobutylene midblock depends on the desired structure of the final product, for example, for the preparation of a linear triblock copolymer difunctional initiators, while for the preparation of a radial block copolymers initiators having a functionality of three or more should be used. As used herein "functionality" is meant to refer to the number of active sites of the initiator capable of initiating living isobutylene polymerization upon the addition of the coinitiator of the general formula of $MX_n$ in which M is titanium, aluminum, boron or tin; X is a halogen; and n is a positive whole number. Any of the above Lewis acids of the formula $MX_n$ may be used as coinitiators, however, some compounds are preferred over others. For example, the aluminum and tin chlorides function less efficiently in the process of the invention, while titanium tetrachloride produces exceptional results and the latter compound is, therefore, especially preferred.

The initiator components of the invention have the formula

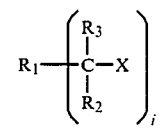

in which $R_1$, $R_2$ and $R_3$ are alkyl, aryl, or aralkyl groups usually of 1 to about 20 and preferably 1 to 8 carbon atoms and can be the same or different and X is a carboxyl, an alkoxyl, a hydroxyl group, or a halogen, and i is a positive whole number, and is used in conjunction with a Lewis acid component of the formula $MX_n$.

As previously indicated, the initiator of the type contemplated by the invention may be tert-esters or tert-ethers producing in situ electron pair donors upon the addition of the $MX_n$, or tert-hydroxyl or tert-halogen containing compounds that require the purposeful addition of inherent electron pair donors so as to give living polymerization systems. Suitable initiators are cumyl esters of hydrocarbon acids, and alkyl cumyl ethers. Representative initiators, for example, comprise compounds such as 2-acetyl-2-phenylpropane, i.e., cumyl acetate; 2-propionyl-2-phenylpropane, i.e., cumylmethyl-ether; 1,4-di(2-methoxy-2-propyl)benzene, i.e., di(cumylmethyl ether); the cumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); the aliphatic halides, particularly the chlorides, i.e., 2-chloro-2,4,4-trimethylpentane, 2,6-dichloro-2,4,4,6-tetramethylheptane; cumyl and aliphatic hydroxyls such as 1,4-di(2-hydroxyl-2-propylbenzene) and 2,6-dihydroxyl-2,4,4,6-tetramethyl-heptane and similar compounds. Among the preceeding, the polyfunctional compounds are particularly preferred.

In selection of the solvent or solvent mixture the following aspects. should be considered: (1) The selected solvent or solvent mixture should preferably keep the polyisobutylene and the final block copolymer in solution and (2) should provide a solvent medium having some degree of polarity in order for the polymerization to proceed at a reasonable rate. To fulfill this complex requirement a mixture of nonpolar and polar solvent is preferred. Suitable nonpolar solvent will include hydrocarbons and preferably aromatic or cyclic hydrocarbons or mixtures thereof. Such compounds include, for instance, methylcyclohexane, cyclohexane, toluene, carbon disulfide and others. Appropriate polar solvents include halogenated hydrocarbons, normal, branched chain or cyclic hydrocarbons. Specific compounds include the preferred liquid ones such as ethyl chloride, methylene chloride, methyl-chloride, n-butyl chloride, chlorobenzene, and other chlorinated hydrocarbons. Any of the above solvents may be used, however, some compounds are preferred over others. For example, a mixture of methylcyclohexane or cyclohexane with methylene chloride or methyl chloride produces exceptional results and therefore, are especially preferred. To achieve suitable polarity and solubility, it has been found, for example, that the ratio of the nonpolar solvent to the polar solvent, on a volume basis, should be from about 80/20 to about 50/50. However, the use of a ratio of about 60/40 has been found to provide particularly good results and the use of this ratio is preferred.

Inasmuch as chain transfer or irreversible termination does not occur during the synthesis of the living polyisobutylene midblock, molecular weight control can be accomplished merely by adjusting the relative amount of isobutylene and initiator present in the reaction mixture. The polymer will continue to grow as long as monomer is available for reaction.

After obtaining the living polyisobutylene midblock of desired molecular weight and functionality, a suitable inherent electron pair donor having a donor number from about 15 to about 50, such as dimethyl acetamide or dimethyl sulfoxide is added to the reaction mixture in about 1/1–1/10 molar ratio to the chain end functionality to obtain high blocking efficiency, and to prevent side reactions (such as intra- or intermolecular alkylation) in the subsequent polymerization of the second monomer.

While not wishing to be bound by the theory, it is postulated that when electron pair donors are added to the system, such donors share their electron with the carbocations, thereby reducing their reactivity. This in turn reduces the growing chains, latent tendency to split off protons which can lead to chain transfer to monomer, to react internally with themselves, or to react with other chains, or to accept reaction-terminating halogen ions from the counterions.

A further advantage of moderating the reactivity of the growing chains by the addition of the electron donor is that the rate of polymerization is reduced relative to the rate of crossover from the di- or multifunctional polyisobutylene cation to the second monomer added, favoring the formation of uniform block copolymers, It is important therefore that the electron pair donor be selected so that it has a sufficient donor number to produce the action described.

The tendency of, or "strength" of the electron pair donor to share its electrons with the growing cation has been referred to as its "donor number", DN. The DN has been defined by Gutmann in the article cited hereinafter and defined as the molar enthalpy value for the interaction of the donor with $SbCl_5$ as a reference acceptor in a $10^{-3}$ M solution of dichloroethane. It has been found that the DN of the electron pair donor should be at least 15 if the undesirable reactions referred to are to be avoided and the advantageous preferred effect is to be achieved; while it should not exceed a value of about 50 in order that practical reaction rates can be achieved.

Among the numerous electron pair donors suitable for use with this invention may be mentioned the following liquid ones such as ethyl acetate, dimethyl acetamide, dimethyl formamide, dimethyl sulfoxide, hexamethyl phosphoric triamide, N-methyl-2-pyrrolidinone, pyridine, acetone, methylethyl ketone and many others. Some typical electron pair donors and their donor numbers are listed by Viktor Gutmann in the "Donor-Acceptor Approach to Molecular Interactions", Plenum Press, New York (1978).

The ratio of the electron pair donors to the growing active center is normally in the range of 1/10 to 1/1—preferably 1/1, but the ratio of growing center plus electron pair donors to the Lewis acid should be at least 1/1 or preferably smaller ($\frac{1}{2}$) in order to maintain a practical polymerization rate. In determination of the proper ratios it should also be considered that certain initiators, such as the ester or ether type, do form an in situ electron pair donor in the first stage of polymerization, i.e., in the synthesis of the polyisobutylene macrocation, and therefore its amount should be taken into account. Furthermore, when initiators not forming an in situ electron pair donor, such as the hydroxyl or halogen type initiators are employed, inherent electron pair donors must be used in the first stage of polymerization, i.e., in the synthesis of the polyisobutylene macrocation, and therefore their amount should be taken into account.

The addition of electron pair donors is followed by the addition of the second monomer such as styrene or styrene derivative or indene or indene derivative, or their mixtures. Among the numerous monomers suitable for use with the invention may be mentioned the following representative members: p-methylstyrene, p-tert.-butylstyrene, p-chlorostyrene, indene, 6-methylindene, 5,7-dimethylindene, 4,6,7-trimethylindene and many others, or the mixture of above monomers. For high temperature applications monomers forming higher $T_g$ polymers such as polyindene ($T_g=240°-260°$ C.) or polyindene derivatives are preferred. The application of high $T_g$ polymers is also desirable if the ultimate product should exhibit low tensile set. In order to improve the processability of the ultimate block copolymers alkylated derivatives of styrene or indene, such as p-tert.-butylstyrene or p-methylstyrene or 5,7-dimethylindene are preferred. Thermoplastic elastomers containing copolymer glassy endblocks are new to the art and provide the end-users with versatility. For instance, the $T_g$ of the endblocks can be regulated by the compositions of the copolymer endblocks; incorporation of halogen monomers provides improved flame resistance; and processability can be improved by the incorporation of monomers containing alkyl-substituted aromatic groups. Also, relative high to high $T_g$'s can be obtained such as 140° to 260° C.

Formation of the endblocks at the polyisobutylene ends commences immediately upon addition of the aromatic monomer such as styrene or indene or their derivatives, or their mixtures, to the reaction mixture containing the mono-, di- or multifunctional polyisobutylene cations. A slight amount of homopolymer may form from the second monomer by initiation induced by protic impurities (traces of moisture) present in the system but this may be advantageous as it will act as a reinforcing filler. This homopolymerization, however, my be prevented by the addition of well-known proton scavengers such as 2,6-di-tert.-butylpyridine, 4-methyl-2,6-di-tert.-butylpyridine, 1,8-bis(dimethylamino)-naphtalene and diisopropylethyl amine.

The nature of proton scavengers are well known and described in the Journal of Macromolecular Science Chemistry, vol. A 18, No. 1, 1982, pgs. 1-152 or Carbocationic Polymerization by Joseph P. Kennedy and Ernest Marechal at pgs. 32, 199, 449, 452 460 and 461 and incorporated by references herein. Proton scavengers should be added to the reaction mixture before the addition of said second monomer or mixture of monomers, or preferably before the addition of said $MX_n$. When the product desired has been achieved, the reaction can be terminated, for example, by adding a nucleophilic terminating agent such as methanol, ethanol, pyridine, ammonia, an alkyl amine or water.

As is normally the case, product molecular weights are determined by reaction time, temperature, concentration, the nature of the reactants, and similar factors. Consequently, different reaction conditions will produce different products. Synthesis of the desired reaction product will be achieved, therefore, through monitoring the course of the reaction by the examination of samples taken periodically during the reaction, a technique widely employed in the art and shown in the examples.

The properties of the block copolymers contemplated by the invention will depend upon the relative lengths of the polyisobutylene mid block portion as well as the amount and nature of the second monomer, or mixtures of monomers, viz., the endblocks (polystyrene or polyindene or their copolymers, or polymers and copolymers formed from their derivatives). The elastomeric properties of the ultimate block copolymer will depend on the length of the midblock chain, with a molecular weight of from about 2,000 to about 30,000 tending to produce rather inelastic products. On the other hand, when the midblock portion approaches a molecular weight of $\overline{M_n}=40,000$ or above, the product will exhibit more rubbery characteristics. The hard segments of the block copolymers described will exhibit glass transition temperatures characteristic for the given monomer, i.e., 95° C. for polystyrene, 130° C. for poly(p-tert.-butylstyrene) and 240°-260° C. for polyindene. Thus products suitable for high temperature applications can be produced with polyindene or polymers of indene derivatives. Furthermore, by the use of the mixture of the appropriate monomers, copolymer hard segments can be prepared. Thus the desired properties of the ultimate product can be tailor made in a manner such as combining p-tert.-butylsytrene with indene to provide high $T_g$ and good processability. Moreover, the saturated nature of said block copolymers provide oxidative stability and reprocessability in the absence of stabilizers without deterioration of physical properties and are useful as molding compositions alone or with other polymers or modifiers of other polymers analogous to the uses of the Kraton block copolymers. It should be noted that our block copolymers are more stable than the Kraton block copolymers and where they contain indene or its derivative blocks, have substantially higher glass transition temperatures.

The block copolymers described in the preceding may be recovered from the reaction mixtures by any of the usual techniques including hot water coagulation in a stirred vessel, or by precipitation with a non-solvent such as an alcohol or alcohol/acetone mixture, followed by drying.

While not intended to be limiting in nature, the following examples are illustrative and representative of the invention.

Example I

Production of the Living Polyisobutylene block:

A 250 ml round bottom flask equipped with a stirrer was charged with 90 mls of methylcyclohexane, 60 mls of methyl chloride and 0.089 gm ($4 \times 10^{-4}$ mole) of dicumyl ether and 0.05 ml of dimethyl sulfoxide. After cooling to $-80°$ C., 6 mls of prechilled isobutylene were added, followed by the addition of 0.66 ml ($6 \times 10^{-3}$ mole) titanium tetrachloride. The polymerization thus initiated was allowed to continue for 15 minutes. Thereafter, at 15 minute intervals, four additional portions of 6 mls each of isobutylene were added. At this point, a sample was withdrawn for GPC measurement which showed $\overline{M_n}=57,800$ and $\overline{M_w}/\overline{M_n}=1.18$, $I_{eff}=95\%$.

Production of the Endblocks:

To the above living polyisobutylene mixture 0.05 ml of dimethyl sulfoxide was introduced, followed by the addition of 20 mls of styrene dissolved in 15 mls of methylcyclohexane and 10 mls of methyl chloride, all prechilled to $-80°$ C. The polymerization was allowed to proceed for 30 minutes before being terminated by the addition of prechilled methanol. The product was precipitated in methanol and the precipitate was dried to obtain the ultimate block copolymers. Thus 37.5 gms of the copolymer was formed with 95% conversion: 21.6 g of which was the PIB block and 15.9 gm was the polystyrene blocks, the polystyrene content being 28.4 mole % (42.4 wt%). $^1$H NMR spectroscopy showed 31 mole % (45.5 wt %) polystyrene content. Subsequent examination by GPC analysis showed the incorporation of styrene and distinctive increase of the molecular weight relative to that of the PIB dication while the molecular weight distribution remained comparatively narrow ($\overline{M_w}/\overline{M_n}=1.39$ by PIB calibration) indicating uniform distribution of styrene units in the product. Thus, this block polymer can be either cast or compressed to form films which are transparent and have tensile greater than 550, in fact greater than 1000 psi and with elongation greater than 100% and usually greater than 200%. Thus, these block copolymers are truly elastomeric. The size of the polystyrene endblocks calculated from yield data was about $\overline{M_n} \cong 21,000$ on each side of the PIB block.

The polymer sample then was compression molded at 150° C./50,000 psi and the transparent homogeneous film showed a tensile strength at break, $\delta=1920$ psi and elongation $\epsilon=540\%$. The sample then was repeatedly molded without deterioration of the above tensile data. Thus, these data demonstrate that this block copolymer could be used to mold an article and the scrap could be reused to mold a further article.

Example II

With the equipment and a procedure like that of the preceding example, 90 mls of methylcyclohexane, 60 mls of methyl chloride and 0.089 gm ($4 \times 10^{-4}$ mole) of dicumyl ether and 0.05 ml of dimethyl acetamide were combined and cooled to $-80°$ C. Six mls of prechilled isobutylene were added followed by the addition of 0.66 ml ($6 \times 10^{-3}$ mole) titanium tetrachloride; polymerization was continued for 15 minutes at which time an additional 6 mls of isobutylene were added. The polymerization was continued for 15 minutes and a sample was withdrawn for GPC measurement which showed $\overline{M_n}=23{,}000$ and $\overline{M_w}/\overline{M_n}=1.15$, $I_{eff}=93\%$. Then 0.05 ml of dimethyl acetamide was introduced, followed by the addition of 8 mls of styrene dissolved in a mixture of 15 mls of methylcyclohexane and 10 mls of methyl chloride, all prechilled to $-80°$ C. The polymerization was allowed to proceed for 20 minutes before being terminated by the addition of prechilled methanol. The product was then precipitated in methanol and the precipitate dried. Thus, 17.9 gms of polymer were recovered which represent 100% conversion, 8.6 g of which was PIB and 9.3 gm was polystyrene, the polystyrene content being 36.8 mole % (51.9 wt %). $^1$H NMR spectroscopy showed 38 mole % (53 wt %) polystyrene content. Subsequent examination by GPC showed the incorporation of styrene and distinctive increase of the molecular weight relative to that of the PIB dication, while the molecular weight distribution remained comparatively narrow ($\overline{M_w}/\overline{M_n}=1.43$ by PIB calibration) indicating uniform distribution of polystyrene in the block copolymer as distinguishing from the non uniform and non homogenous ones of the prior art. The size of the polystyrene endblocks calculated from yield data was about $\overline{M_n}\cong 10{,}000$ on each side of the PIB block segment.

The polymer sample then was compression molded at 150° C./50,000 psi and showed a tensile strength at break, $\delta=1360$ psi and elongation $\epsilon=310\%$. The sample then was repeatedly molded without deterioration of the above tensile data. Thus, the data demonstrate that this block copolymer could be used to mold an article and that the scrap could be reused to mold a further article.

Example III

With equipment and a procedure like that of the preceding example, 90 mls of methylcyclohexane, 60 mls of methyl chloride and 0.045 gm ($2\times 10^{-4}$ mole) of dicumyl ether and 0.025 ml of dimethyl acetamide were combined and cooled to $-80°$ C. Six mls of prechilled isobutylene were added, followed by the addition of 0.33 ml ($3\times 10^{-3}$ mole) titanium tetrachloride and polymerization was continued for 15 minutes, and thereafter at 15 minute intervals four additional portions of 6 mls of isobutylene were added. A sample was withdrawn for GPC measurement which showed $\overline{M_n}=78{,}900$ and $\overline{M_w}/\overline{M_n}=31$, $I_{eff}=130\%$. Then 0.025 ml of dimethyl acetamide was introduced, followed by the addition of 20 mls of styrene dissolved in a mixture of 15 mls of methylcyclohexane and 10 mls of methyl chloride, all prechilled to $-80°$ C. The polymerization was allowed to proceed for 30 minutes before being terminated by the addition of prechilled methanol. The product was then precipitated in methanol and the precipitate was dried. Thus 38.4 gms of polymer were formed with 100% conversion, 21.6 g of which was PIB and 16.8 gm was polystyrene, the polystyrene content being 29.6 mole % (43.8 wt %). $^1$H NMR spectroscopy showed 19 mole % (30.3 wt %) polystyrene content. Subsequent examination by GPC showed the incorporation of styrene and a distinctive increase of the molecular weight relative to that of the PIB dication, while the molecular weight distribution remained comparatively narrow ($\overline{M_w}/\overline{M_n}=1.43$ by PIB calibration) indicating uniform distribution of styrene units in the final product. The size of the polystyrene endblocks calculated from yield data was about $M_n=30{,}000$ on each side of the PIB midblock.

The polymer sample then was compression molded at 150° C./50,000 psi and the homogenous transparent film showed a tensile strength at break, $\delta=1920$ psi and elongation $\epsilon=720\%$. The sample repeatedly was molded without deterioration of the above tensile data. Thus, these data demonstrate that this block copolymer could be used to mold an article and that the scrap could be reused to mold a further article.

Example IV

With the equipment and a procedure like that of the preceding example, 90 mls of methylcyclohexane, 60 mls of methyl chloride and 0.118 gm ($4\times 10^{-4}$ mole) of tricumyl ether and 0.05 ml of dimethyl acetamide were combined and cooled to $-80°$ C. Six mls of prechilled isobutylene were added, followed by the addition of 1 ml ($1\times 10^{-2}$ mole) titanium tetrachloride and the polymerization was continued for 15 minutes, and thereafter at 15 minute intervals, four additional portions of 6 mls of isobutylene were added. A sample was withdrawn for GPC measurement which showed $\overline{M_n}=61{,}300$ and $\overline{M_w}/\overline{M_n}=1.33$, $I_{eff}=88\%$. Then 0.05 ml of dimethyl acetamide was introduced, followed by the addition of 20 mls of styrene dissolved in a mixture of 15 mls of methylcyclohexane and 10 mls of methyl chloride, all prechilled to $-80°$ C., and then the polymerization was allowed to proceed for 30 minutes before being terminated by the addition of prechilled methanol. The product was then precipitated in methanol and the precipitate was dried. Thus, 37.5 gms of polymer was formed with 100% conversion, 21.6 g of which was PIB and 15.9 gm is polystyrene, the polystyrene content being 28.4 mole % (42.4 wt %). $^1$H NMR analysis showed 25 mole % (38 wt %) polystyrene content.

The product was a star-shaped block copolymer of the structure shown:

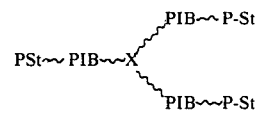

where X is the residue from the initiator, tricumyl chloride. Subsequent examination by GPC analysis showed the incorporation of styrene and a distinctive increase of the molecular weight relative to that of the PIB trication, while the molecular weight distribution remained comparatively narrow ($\overline{M_w}/\overline{M_n}=1.43$ by PIB calibration) indicating uniform distribution of polystyrene in the final product. The molecular weight of the polystyrene endblocks calculated from yield data was about $\overline{M_n}\cong 15{,}000$ on the three arms of the PIB midblock and essentially of equivalent length in each branch or end block.

The polymer sample then was compression molded at 150° C./50,000 psi and showed a tensile strength at break, $\delta=1990$ psi and elongation $\epsilon=390\%$. The sample repeatedly was molded without deterioration of the above tensile data. Thus, these data demonstrate that this block copolymer could be used to mold an article and that the scrap could be reused to mold a further article.

The next three examples (V-VII) demonstrate the advantageous effects of 2,6-di-tert.-butylpyridine and related Proton scavengers on the preparation of block copolymers.

Example V

With equipment and a procedure like that of the preceding example, 90 mls of methylcyclohexane, 60 mls of methyl chloride and 0.097 gm ($6 \times 10^{-4}$ mole) of cumyl methyl ether were combined and cooled to $-80°$ C. Six mls of prechilled isobutylene were added, followed by the addition of 0.92 ml ($8 \times 10^{-3}$ mole) titanium tetrachloride and the polymerization was continued for 15 minutes, and thereafter at 15 minute intervals five additional portions of 6 mls of isobutylene were added. A sample was withdrawn for GPC measurement showed $\overline{M_n} = 50,500$ and $\overline{M_w}/\overline{M_n} = 1.21$, $I_{eff} = 85\%$. Then 0.06 ml of dimethyl acetamide was introduced, followed by the addition of 12 mls of styrene dissolved in a mixture of 12 mls of methylcyclohexane and 12 mls of methyl chloride, all prechilled to $-80°$ C. The polymerization was allowed to proceed for 30 minutes before being terminated by the addition of prechilled methanol. The product was then precipitated in methanol and the precipitate was dried. Thus 36.8 gms of diblock copolymer were formed with 100% conversion, 25.9 gms of diblock copolymer were thus formed with 100% conversion, 25.9 g of which was PIB and 10.9 gm was polystyrene, the polystyrene content being 18.5 mole % (30 wt %). After extraction of the homopolystyrene by methyl-ethyl ketone $^1$H NMR spectroscopy showed 11.8 mole % (19.9 wt %) polystyrene content. Subsequent examination by GPC analysis showed the incorporation of styrene and a distinctive increase of the molecular weight ($\overline{M_n} = 57,600$; by PIB calibration) relative to that of the PIB cation; the molecular weight distribution remained comparatively narrow $\overline{M_w}/\overline{M_n} = 1.57$ by PIB calibration. The size of the polystyrene block calculated from 1H NMR spectroscopy data was about $\overline{M_n} \cong 12,500$. The sample was compression molded at 150° C./15,000 psi for 30 minutes. It possessed low tensile strength as expected. However, the diblock nature of the material renders it useful as a compatabilizing agent for blends of polystyrene and polyisobutylene, for example.

Example VI

With equipment and a procedure like that of the preceding example, 90 mls of methlcyclohexane, 60 mls of methyl chloride and 0.097 gm ($6 \times 10^{-4}$) of cumyl methyl ether were combined and cooled to $-80°$ C. Six mls of prechilled isobutylene were added, followed by the addition of 0.92 ml ($8 \times 10^{-3}$) titanium tetrachloride and polymerization was continued for 15 minutes, and thereafter at 15 minute intervals five additional portions of 6 mls of isobutylene were added. A sample was withdrawn for GPC measurement which showed $\overline{M_n} = 50,300$ and $\overline{M_w}/\overline{M_n} = 1.17$, $I_{eff} = 86\%$. Then 0.06 ml of dimethyl acetamide and 0.20 ml of 2,6-di-tert.-butylpyridine (a proton trap) were introduced, followed by the addition of 12 mls of styrene dissolved in a mixture of 12 mls of methylcyclohexane and 12 mls of methyl chloride, all prechilled to $-80°$ C. The polymerization was allowed to proceed for 30 minutes before being terminated by the addition of prechilled methanol. The product was then precipitated in methanol and the precipitate was dried. Thus 36.8 gms of diblock copolymer were formed with 100% conversion, 25.9 g of which was PIB and 10.9 gm was polystyrene, the polystyrene content being 18.5 mole % (30 wt %). After extraction with methylethyl ketone, $^1$H NMR spectroscopy showed 17.7 mole % (28.5 wt %) polystyrene content. Subsequent examination by GPC analysis showed the incorporation of styrene and a distinctive increase of the molecular weight ($\overline{M_n} = 65,600$; by PIB calibration) relative to that of the PIB cation; the molecular weight distribution remained comparatively narrow ($\overline{M_w}/\overline{M_n} = 1.57$ by PIB calibration). The size of the polystyrene block calculated from $^1$H NMR spectroscopy data was about $\overline{M_n} \cong 20,100$. These data show that in the presence of the proton trap virtually all of the styrene incorporated into the copolymer block, yielding higher molecular weight polystyrene segment and negligible amount of homopolystryrene.

The sample was compression molded at 150° C./15,000 psi for 30 minutes. It possessed low tensile strength as expected. However, the diblock nature of the material renders it useful as a compatabilizing agent for blends of polystyrene and polyisobutylene, for example.

Example VII

With equipment and a procedure like that of the preceding example, 90 mls of methylcyclohexane, 60 mls of methyl chloride and 0.088 gm ($4 \times 10^{-4}$ mole) of dicumyl ether were combined and cooled to $-80°$ C. Six mls of prechilled isobutylene were added, followed by the addition of 0.7 ml ($6.4 \times 10^{-3}$ mole) titanium tetrachloride and polymerization was continued for 15 minutes, and thereafter at 15 minute intervals four additional portions of 6 mls of isobutylene were added. A sample was withdrawn for GPC measurement which showed $\overline{M_n} = 61,900$ and $\overline{M_w}/\overline{M_n} = 1.24$, $I_{eff} = 87\%$. Then 0.05 ml of dimethyl acetamide and 0.20 ml of 2,6-di-tert.-butylpyridine (a proton trap) were introduced, followed by the addition of 18 mls of styrene dissolved in a mixture of 20 mls of methylcyclohexane and 20 mls of methyl chloride, all prechilled to $-80°$ C. The polymerization was allowed to proceed for 30 minutes before being terminated by the addition of prechilled methanol. The product was then precipitated in methanol and the precipitate was dried. Thus 36.1 gms of polymer were formed with 95% conversion, 21.6 g of which was PIB and 14.5 gm was polystyrene, the polystyrene content being 26 mole % (40 wt %). $^1$H NMR spectroscopy showed 22.5 mole % (35.0 wt %) polystyrene content. Subsequent examination by GPC analysis showed the incorporation of styrene and a distinctive increase of the molecular weight relative to that of the PIB dication, while the molecular weight distribution remained comparatively narrow ($\overline{M_w}/\overline{M_n} = 1.43$ by PIB calibration) indicating the uniform distribution of styrene units in the block copolymer with the styrene blocks on each end being essentially the same length. The size of the polystyrene endblocks calculated from yield data was about $\overline{M_n} \cong 18,100$ on each side of the PIB midblock.

The polymer sample then was compression molded at 150° C./50,000 psi and the transparent homogenous film showed a tensile strength at break, $\delta = 2720$ psi and elongation $\epsilon = 380\%$. The compression molded film was transparent, indicating the absence of homopolystyrene, in contrast to the haziness of the films made from block copolymers prepared in the absence of the proton trap 2,6-di-tert.-butylpyridine. The sample repeatedly was molded without deterioration of the above tensile data. Thus, these data demonstrate that this block copolymer could be used to mold an article and that the scrap could be reused to mold a further article. It should be noted that the tensile strength of this film is comparative to that of butadiene of styrene reinforced sulfur cured film.

Example VIII

With the equipment and procedure like that of Example I, employing exactly the same conditions (temperature, concentration, etc.) a block copolymer was prepared, the only difference being that p-tert.-butylstyrene was used to make the endblocks.

A sample withdrawn after the preparation of the PIB midblock showed $\overline{M_n}=57,200$ and $\overline{M_w}/\overline{M_n}=1.13$ with 95% $I_{eff}$. Thus 37.2 gms of polymer were recovered 21.6 gm of which was PIB and 15.6 gm was poly(p-tert.-butylstyrene), the poly(p-tert.-butylstyrene) content being 20.2 mole % (42 wt %). $^1$H NMR spectroscopy showed 15 mole % (33.5 wt %) poly(p-tert.-butylstyrene) content. Subsequent examination by GPC analysis showed the incorporation of p-tert.-butylstyrene and distinctive increase of the molecular weight relative to that of the PIB dication, while the molecular weight distribution remained comparatively narrow ($\overline{M_w}/\overline{M_n}=1.43$ by PIB calibration). The size of the poly(p-tert.-butylstyrene) endblocks calculated from yield data is about $M_n \cong 20,500$ on each side of the PIB midblock.

The polymer sample then was compression molded at 150° C./50,000 psi and showed a tensile strength at break, $\delta=1750$ psi and elongation $\epsilon=470\%$. The sample repeatedly was molded without deterioration of the above tensile data. The same sample compression molded repeatedly at 170° C./50,000 psi showed a tensile strength at break, $\delta=1690$ psi and elongation $\epsilon=570\%$. Thus, these data demonstrate that this block copolymer could be used to mold an article and that the scrap could be reused to mold a further article.

Example IX

With the equipment and procedure like that of Example I, employing exactly the same conditions (temperature, concentration, etc.) a block copolymer was prepared, the only difference being that altogether four 6 ml portions of isobutylene were used to prepare the PIB midblock and that p-methylstyrene was used to make the endblocks.

A sample withdrawn after the preparation of the PIB midblock showed $\overline{M_n}=42,100$ and $\overline{M_w}/\overline{M_n}=1.23$ with 95% $I_{eff}$. Thus, 32 gms of polymer were recovered 17.3 gm of which is PIB and 14.7 gm is poly(p-methylstyrene), the poly(p-methylstyrene) content being 29 mole % (46.0 wt %). $^1$H NMR spectroscopy showed 32.9 mole % (51 wt %) poly(p-methylstyrene) content. Subsequent examination by GPC analysis showed the incorporation of p-methylstyrene and a distinctive increase of the molecular weight relative to that of the PIB dication, while the molecular weight distribution remained comparatively narrow ($\overline{M_w}/\overline{M_n}=1.43$ by PIB calibration). The size of the poly(p-methylstyrene) endblocks calculated from yield data was about $\overline{M_n} \cong 13,000$ on each side of the PIB midblock.

The polymer sample was then compression molded at 150° C./psi and showed a tensile strength at break, $\delta=1470$ psi and elongation $\epsilon=300\%$. The sample repeatedly was molded without deterioration of the above tensile data. Thus, these data demonstrate that this block copolymer could be used to mold an article and that the scrap could be reused to mold a further article.

Example X

With the equipment and procedure like that of Example I, employing exactly the same conditions (temperature, concentration, etc.) a block copolymer is prepared, the only difference being that p-chlorostyrene is used to make the endblocks.

A sample withdrawn after the preparation of the PIB midblock shows $\overline{M_n}=57,200$ and $\overline{M_w}/\overline{M_n}=1.13$ with 95% $I_{eff}$. Examination by GPC analysis shows the incorporation of p-chloro-styrene and a distinctive increase of the molecular weight relative to that of the PIB dication, while the molecular weight distribution remains comparatively narrow.

Incorporation of halogen substituents on the glassy outer blocks confers improved flame resistance to the final product.

Example XI

With the equipment and procedure like that of Example I, employing exactly the same conditions (temperature, concentration, etc.) a block copolymer was prepared, the only difference being that altogether four 6 ml portions of isobutylene were used to prepare the PIB midblock and that 12 mls of indene were used to make the endblocks.

A sample withdrawn after the preparation of the PIB midblock shows $\overline{M_n}=42,600$ and $\overline{M_w}/\overline{M_n}=1.24$ with 95% $I_{eff}$. Thus 22.7 gms of polymer are recovered 17.2 gm of which was PIB and 5.5 gm was polyindene, the polyindene content being 13.2 mole % (23.9 wt %). $^1$H NMR spectroscopy showed 17.4 mole % (29 wt %) polyindene content. Subsequent examination by GPC showed the incorporation of indene and a distinctive increase of the molecular weight relative to that of the PIB dication, while the molecular weight distribution remained comparatively narrow ($\overline{M_w}/\overline{M_n}=1.50$ by PIB calibration). The size of the polyindene endblocks calculated from yield data is about $\overline{M_n} \cong 6900$ on each side of the PIB midblock.

Tensile tests were performed on specimens prepared from films cast from carbontetrachloride, dried at room temperature for 24 hours at 50° C. in a vacuum oven for 12 hours, showing a tensile strength at break $\delta=1800$ psi and ultimate elongation $\epsilon=540\%$.

Example XII

With the equipment and procedure like that of Example I, employing exactly the same conditions (temperature, concentration, etc.) a block copolymer was prepared, the only difference being that the mixture of 8.3 gms indene and 11,7 gms p-tert.-butylstyrene dissolved in 10 mls of methylcyclohexane and 10 mls of methyl chloride, combined with 0.2 ml 2,6-di-tert.-butylpyrinide, all prechilled, were used to make the endblocks.

A sample withdrawn after the preparation of the PIB midblock showed $\overline{M_n}=57,400$ and $\overline{M_w}/\overline{M_n}=1.34$ with 88% $I_{eff}$. Thus 38.8 gms of polymer were recovered with 93% conversion, 21.6 gm of which was PIB and 18.6 gm was poly(indene-co-p-tert.-butylstyrene), the hard block content being 15.7 mole % (48 wt %). Subsequent examination by GPC showed the incorporation of glassy copolymer and distinctive increase of the molecular weight relative to that of the PIB dication, while the molecular weight distribution remained comparatively narrow ($\overline{M_w}/\overline{M_n}=1.46$ by PIB calibration). The size of the glassy copolymer endblocks calculated from yield data is about $\overline{M_n} \cong 25,000$ on each side of the PIB midblock.

Differential Scanning Calorimetry (DSC) gave a single $T_g = 170°$ C. for the copolymer endblocks, in between the $T_g$s of the polymers of the individual aromatic monomers, polyindene and poly(p-tert.-butylstyrene) ($T_g - 240°-260°$ C. and $130°$ C., respectively). A film cast from CCl$_4$ solution and subsequently dried in vacuum showed a tensile strength at break $\delta = 2850$ psi and ultimate elongation $\epsilon = 390\%$. Thus, these data demonstrate that a block copolymer can be designed for a wide variety of end use temperatures, while maintaining the valuable characteristics of the previous examples such as a $T_g$ of about $130°-260°$ C. to greater than $130°$ C. and preferably $150°$ to $260°$ C.

Example XIII

With the equipment and procedure like that of Example I, employing exactly the same conditions (temperature, concentration, etc.) a block copolymer is prepared, the only difference being that the mixture of 8.3 gms p-chlorostyrene and 11.7 gms p-methylstyrene dissolved in 10 mls of methylcyclohexane and 10 mls of methylchloride, combined with 0.2 ml 2,6-di-tert.-butylpyridine, all prechilled, are used to make the endblocks.

A sample withdrawn after the preparation of the PIB midblock shows $\overline{M_n} = 57,400$ and $\overline{M_w}/\overline{M_n} = 1.34$ with 88% $I_{eff}$. Examination of the final product by GPC shows the incorporation of glassy copolymer and a distinctive increase of the molecular weight relative to that of the PIB dication, while the molecular weight distribution remains comparatively narrow confirming the formation of block copolymers. $^1$H NMR spectroscopy shows the incorporation of p-chlorostyrene and p-methylstyrene into the final product. The incorporation of halogen substituents onto the glassy endblocks confers improved flame resistance of the final product.

Example XIV

A 500 ml round bottom flask equipped with a stirrer and cooled to $-40°$ C. was charged with 200 ml methyl chloride, 1.872 g (0.01 mole) 2,6-dihydroxy-2,4,4,6-tetramethylheptane, 1.8 ml dimethylacetamide, 34 ml isobutylene and the polymerization was started by the addition of 12 ml BCl$_3$. The polymerization was allowed to continue for 2.5 hrs. At this point, a sample was withdrawn for GPC measurement which showed $\overline{M_n} = 2420$ and $\overline{M_w}/\overline{M_n} = 1.16$, $I_{eff} = 95\%$. To the above mixture 20 mls of styrene dissolved in 20 mls of CH$_3$Cl and prechilled to $-40°$ C. are added and the polymerization is allowed to continue for 1 more hour before being terminated by the addition of prechilled methanol. The product is precipitated in methanol and the precipitate is dried in vacuo at room temperature to obtain the ultimate block copolymers. Examination by GPC analysis shows styrene incorporation and a distinctive increase of the molecular weight, confirming the formation of block copolymer.

Example XV

A 500 ml round bottom flask equipped with a stirrer and cooled to $-60°$ C. was charged with 200 ml methyl chloride, 1.16 ($5 \times 10^{-3}$ mole) 1,4-di(2-chloro-2-propyl) benzene, 0.7 ml dimethyl sulfoxide, 15 ml isobutylene and polymerization was started by the addition of 8 ml BCl$_3$. The polymerization was allowed to continue for 2.5 hrs. At this point, a sample was withdrawn for GPC measurement which showed $\overline{M_n} = 2570$ and $\overline{M_w}/\overline{M_n} = 1.14$, $I_{eff} = 97\%$. To the above mixture 20 mls of styrene dissolved in 20 mls of CH$_3$Cl and prechilled to $-60°$ C. are added and the polymerization is allowed to continue for 1 more hour before being terminated by the addition of prechilled methanol. The product is precipitated in methanol and the precipitate is dried in vacuo at room temperature to obtain the ultimate block copolymer. Subsequent examination by GPC analysis shows styrene incorporation and a distinctive increase of the molecular weight, confirming the formation of block copolymer.

Example XVI

A 250 ml round bottom flask equipped with a stirrer and cooled to $-80°$ C. was charged with 90 ml methylcyclohexane, 60 ml CH$_3$Cl, 0.35 ml ($2.1 \times 10^{-3}$ mole) 2-chloro-2,4,4-trimethylpentane, 0.15 ml dimethyl acetamide and 1.75 ml TiCl$_4$, followed by the addition of 10 ml isobutylene. The polymerization thus initiated was allowed to continue for 10 minutes. Thereafter, at 10 min. intervals, three additional portions of 10 mls each of isobutylene were added. At this point, a sample was withdrawn for GPC measurement which showed $\overline{M_n} = 15740$ and $\overline{M_w}/\overline{M_n} = 1.09$ $I_{eff} = 98\%$. At this point 20 mls of styrene dissolved in 20 mls of methylcyclohexane and prechilled to $-80°$ C. are added and the polymerization is allowed to continue for 1 more hour before being terminated by the addition of prechilled methanol. The product is precipitated in methanol and the precipitate is dried in vacuo at room temperature to obtain the ultimate block copolymers. Examination by GPC analysis shows styrene incorporation and a distinctive increase of the molecular weight, confirming the formation of block copolymer.

Example XVII

A 250 ml round bottom flask equipped with a stirrer and cooled to $-80°$ C. is charged with 90 ml methylcyclohexane, 60 ml CH$_3$Cl, 0.43 ml ($2.45 \times 10^{-3}$ mole) 2-acetyl-2-phenylpropane and 14 ml isobutylene, followed by the addition of 1.1 ml TiCL$_4$. The polymerization thus initiated is allowed to continue for 15 minutes. Thereafter, at 15 min. intervals, two additional portions of 14 mls each of isobutylene are added. At this point, 0.36 ml ($2 \times 10^{-3}$ mole) hexamethylphosphoramide of DN=50 is added followed by the addition of 20 mls of styrene dissolved in 20 mls of methylcyclohexane prechilled to $-80°$ C. The polymerization is allowed to continue for 1 more hour before being terminated by the addition of prechilled methanol. The product is precipitated in methanol and the precipitate is dried in vacuo at room temperature to obtain the ultimate block copolymers. Subsequent examination by GPC analysis shows the styrene incorporation and a distinctive increase of the molecular weight, confirming the formation of block copolymer.

Table I shows further physical properties of films made from block copolymers of Examples I to IV and VII, VIII, VIII, IX, XI and XII. All the films were made by compression molding at $150°$ C. and 50,000 psi for 30 minutes except the ones designated VIII and XI. VIII** was made from a sample of the copolymer Example VIII by compression molding at $170°$ C. and 50,000 psi for 30 minutes, and XI and XII were made by casting from carbon tetrachloride as described in Example XI.

The indene in examples XI and XII may be replaced with 5,7-dimethylindene or related indene derivative and the methods of examples XI and XII repeated to give a block copolymer having a midblock of polyisobutylene and end blocks derived from polymerization of 5,7-dimethylindene (example XI) or copolymerization of 5,7-dimethylindene and a styrene derivative (Example XII) or indene derivative.

TABLE I

| Polymers of Example | Tear Strength Die C lb/in | Shore Hardness A - 2 | Melt Flow index 200° C., 5 kg g/10 min | Tensile Set % =250% | Tensile Set % 150% | Modulus 100% psi | Modulus 200% psi | Modulus 300% psi | Tensile Values (psi) | Tensile Values (%) | Type of end segment |
|---|---|---|---|---|---|---|---|---|---|---|---|
| I |  | 40 | 0.3 | 7 | — | 130 | 160 | 270 | 1920 | 540 | St |
| II | 199 | 80 | 13.3 | — | 33 | 510 | 870 | 1280 | 1360 | 310 | St |
| III | 76 | 33 | 0.0 | 8 | — | 100 | 125 | 190 | 1920 | 720 | St |
| IV | 130 | 54 | 0.4 | 16 | — | 270 | 530 | 1240 | 1990 | 390 | St (radial) |
| VII* |  |  |  |  |  | 280 | 990 | — | 1470 | 300 | p-Me-St |
| VIII | 120 | 52 | 27.0 | 14 | — | 180 | 270 | 630 | 1750 | 470 | p-t-Bu-St |
| VIII** |  | 53 | — | — | — | 240 | 310 | 540 | 1690 | 560 | p-t-Bu-St |
| IX |  |  |  |  | 9 | 140 | 190 | 370 | 1800 | 540 | Indene |
| XI |  |  |  | 3 |  | 280 | 720 | 1740 | 2720 | 380 | St |
| XII |  |  |  |  |  | 610 | 1110 | 2080 | 2850 | 390 | Indene/p-t-Bu-St copolymer |

*In the presence of di-tert.-butylpyridine
**After repeated remolding at 170°/50,000 psi The block copolymers of this invention are characterized by their uniformity and homogeneity in the matrix of the polymer with the $\overline{M_w}/\overline{M_n}$ being essentially 1.05 to 2.5 and preferably 1.5 so the film and molded products in uncured state will exhibit a tensile of at least about 500 to 2500 and elongation greater than 100 and preferably 300 to 500%. Analysis indicates the end blocks are essentially equal and preferably greater than 5–10,000 for (heat) results.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A living polymerization process for preparing linear or star-shaped block copolymers of isobutylene and another monomer comprising polymerization isobutylene alone or with another monomer at a temperature of about −10° C. to −90° C. in an anhydrous system of said isobutylene or another monomer, a mixed solvent, imitator and a metal halide selected from the metals of tin, titanium, aluminum, boron, said polymerization system being capable of producing an electron pair donor initiator having the formula:

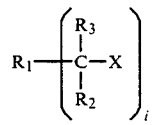

in which $R_1$, $R_2$ and $R_3$ are alkyl, aryl, or aralkyl groups and can be the same or different and x is a carboxyl, alkoxyl, hydroxyl or halogen group, and i is a positive whole number, said mixed solvent being formed of at least one hydrocarbon or halohydrocarbon with or without an electron donor pair solvent having a donor number of about 15 to 50, when x is carboxyl or alkoxy; the mixed solvent being a mixture of hydrocarbon and halohydrocarbon with or without said electron donor pair solvent with said hydrocarbon or halohydrocarbon and when x is hydroxyl or halogen, the mixed solvent must contain an electron pair donor solvent of 15 to 50 donor number when said polymerization of another monomer occurs in the presence of the electron pair donor solvent, the mixed solvent and living polyisobutylene, said another monomer being selected from at least one of styrene, and its halo or alkyl styrenes, indene and alkylated indenes.

2. The process according to claim 1 wherein said initiator forming in situ electron pair donor is selected from the group consisting of
  2, methoxy-2-phenylpropane; 2-acetyl-2-phenylpropane;
  1,4-di(2-methoxy-2-propyl)benzene;
  1,4-di(2-acetyl-2-propyl)benzene;
  1,3,5-tri(2-acetyl-2-propyl)benzene;
  1,3,5-tri(2-methoxy-2-propyl)benzene;
  3-tert.butyl-1,5-di(2-methoxy-2-propyl)benzene;
  2-methoxy-2,4,4-trimethylpentane;
  2-acetyl-2,4,4-trimethylpentane;
  2,6-dimethoxy-2,4,4,6-tetramethylheptane and
  2,6-diacetyl-2,4,4,6-tetramethylheptane; and wherein said initiator not forming in situ electron pair donors is selected from the group consisting of
  2-chloro-2-phenylpropane;
  1,4-di(2-chloro-2-propyl)benzene;
  1,3,5-tri(2-chloro-2-propyl)benzene;
  2-hydroxy-2-phenylpropane;
  1,4-di(2-hydroxy-2-propyl)benzene;
  1,3,5-tri(2-hydroxy-2-propyl)benzene;
  2-chloro-2,4,4-trimethyl-pentane;
  2,6-dichloro-2,4,4,6-tetramethylheptane;
  2-hydroxy-2,4,4-trimethyl-pentane and
  2,6-dihydroxy-2,4,4,6-tetramethylheptane.

3. The process according to claim 2 wherein said metal halide is titanium tetrachloride or boron trichloride.

4. The process according to claim 3 wherein said electron pair donor is selected from the class consisting of dimethyl sulfoxide, dimethyl acetamide and hexamethyl phosphoramide.

5. The process according to claim 4 wherein the ratio of said metal halide to said initiator on a molar basis, is from about 2 to 1 to about 50 to 1; the ratio of said electron pair donor to said initiator on a molar basis, is from about 1 to 10 to about 1 to 1; the ratio of said electron pair donor to said metal halide is at least 1 to 2; or the ratio of said electron pair donor plus said initiator forming in situ electron pair donors combined with said metal halide is at least 1 to 2; and the ratio of non-halogenated hydrocarbon solvent, on a volume basis, is from about 4 to 1 to about 1 to 1.

6. The process according to claim 5 wherein said hydrocarbon solvent is a cycloalkane, and said halogenated hydrocarbon solvent is a halogenated alkane.

7. The process according to claim 6 wherein said cycloalkane is cyclohexane or methylcyclohexane or mixtures thereof, and said halogenated alkane is selected from the group consisting of methyl chloride, methylene chloride, and mixtures thereof.

8. The polymerization process according to claim 1 said other monomer or mixture of other monomers is selected from the group consisting of styrene and its derivatives consisting of normal or branched alkyl or halogen substituents on the aromatic ring and indene and its derivatives consisting of normal or branched alkyl or halogen substituents on the aromatic ring.

9. The polymerization process according to claim 1 said other monomer or mixture of other monomers is selected from the group consisting of styrene, p-tert.-butylstyrene, p-methylstyrene, p-chlorostyrene, indene and mixtures thereof.

10. The polymerization process according to claim 1 wherein a proton scavenger is selected from the group consisting 2,6-di-tert.-butylpyridine, 4-methyl-2,6-di-tert.-butylpyridine, 1,8-bis(dimethylamino)-naphtalene and diisopropylethylamine and is added to the polymerization mixture in the beginning of the polymerization reaction.

11. The polymerization process according to claim 10 wherein said proton scavenger is 2,6-di-tert.-butylpyridine.

12. The process according to claim 11 wherein the concentration of said proton scavenger is at least equal to, or up to 1.5 times higher than the concentration of moisture in the polymerization system.

* * * * *